April 19, 1966 F. D. BAXTER 3,247,320

SIGNAL LEVEL SENSING DEVICE

Filed Jan. 5, 1962 2 Sheets-Sheet 1

INVENTOR
Frank D. Baxter

BY Martha L. Ross
AGENT

SIGNAL LEVEL SENSING DEVICE

Filed Jan. 5, 1962 2 Sheets-Sheet 2

INVENTOR
Frank D. Baxter

BY Martha L. Ross
AGENT

United States Patent Office 3,247,320
Patented Apr. 19, 1966

3,247,320

SIGNAL LEVEL SENSING DEVICE

Frank D. Baxter, Herndon, Va., assignor to Atlantic Research Corporation, Fairfax, Va., a corporation of Virginia Filed Jan. 5, 1962, Ser. No. 164,562
6 Claims. (Cl. 178—69)

This invention relates to means for detecting changes in a carrier level and in particular to equipment for detecting and indicating reduction or drops in the carrier level of telegraph system assurance signals.

In certain data communication systems, such as telegraph systems involving automatic routing selection and short message transmission, there is a maintenance problem encountered in determining where signal distortion is occurring. The signals are being automatically routed over many interconnecting trunk lines, and it is essentially impossible to pinpoint on which specific trunk line the distortion has occurred.

Connected at the termination of each trunk line at the receiving station is a return circuit for each trunk line, on which assurance signals or tones are transmitted to the sending station to indicate that the message is being received. Failure of these assurance signals to reach the sending station would, therefore, indicate that the transmitted message was not being received. If distortion of the transmitted message occurs, it is desirable that the sending station be properly informed of this system defect. One way would be to interrupt the assurance signals, but this is not practical because their absence would indicate to the sending station that its message was not being received.

Accordingly, a monitoring device is installed at each receiving station which continuously measures the telegraph signals being received. If any received pulse is distorted greater than is permissive, the monitoring device reduces the carrier level of the assurance signals by a specified number of decibels for a specified period of time. In this manner, the sending station is informed that the message was received, but that distortion occurred.

The equipment of the subject invention operates in conjunction with this monitoring device and senses or detects these timed db reductions or drops in carrier level to operate an indicating means such as a counter to record the number of occurrences of distortion. Since the apparatus of the subject invention will be associated with each return circuit of each trunkline, then a periodic review of the counter readings will indicate on which trunkline, or trunklines, distortion is occurring.

It is an object of this invention to provide apparatus for detecting a timed change in level of a carrier frequency.

It is a further object to provide apparatus for detecting a power or voltage drop in the level of carrier frequency or frequencies, the drop occurring upon distortion of telegraph signals.

It is another object to provide apparatus for use with a data communication system in locating message distortion by detecting a timed power or voltage drop in signal level and operating an indicating circuit.

Other objects will become apparent by a reading of the following specification in conjunction with the drawings wherein FIGURE 1 is an overall system diagram of the present invention in block and schematic form.

In general, the subject invention comprises a circuit connected in parallel across the line in which alternating current assurance signals are being transmitted back to a telegraph sending station from a receiving station. At the input the signals sampled from the line into this parallel circuit are amplified and filtered. An A.G.C. network is also provided because of the wide range of power levels over which the circuit must operate. The signals are then rectified and fed to a trigger circuit which is conditioned to respond to signals greater than the set threshold level. The output of this trigger circuit is differentiated and used to actuate a one-shot multivibrator to obtain a constant amplitude and constant width pulse for the timing circuits that follow. The timing circuits set the upper and lower limits, above and below which variations and interruptions of the assurance signals will not cause operation of the output means. When distortion occurs on a telegraph trunk line, the assurance signals on the corresponding return circuit experience a timed power drop. The present circuit being in parallel with this return circuit, also experiences this timed power drop. When this drop reaches the trigger circuit, the voltage falls below the threshold level and fails to actuate this circuit. Output from the one-shot multivibrator accordingly ceases and the timing circuits respond. Since the timed voltage drop falls between the set upper and lower timing limits, the output circuit is actuated to operate a counter or other equipment. A delay is also incorporated into the timing circuits so that transients or "hash" which has been found to occur upon initiation of the assurance signals will not actuate the output circuits.

Figure 1:
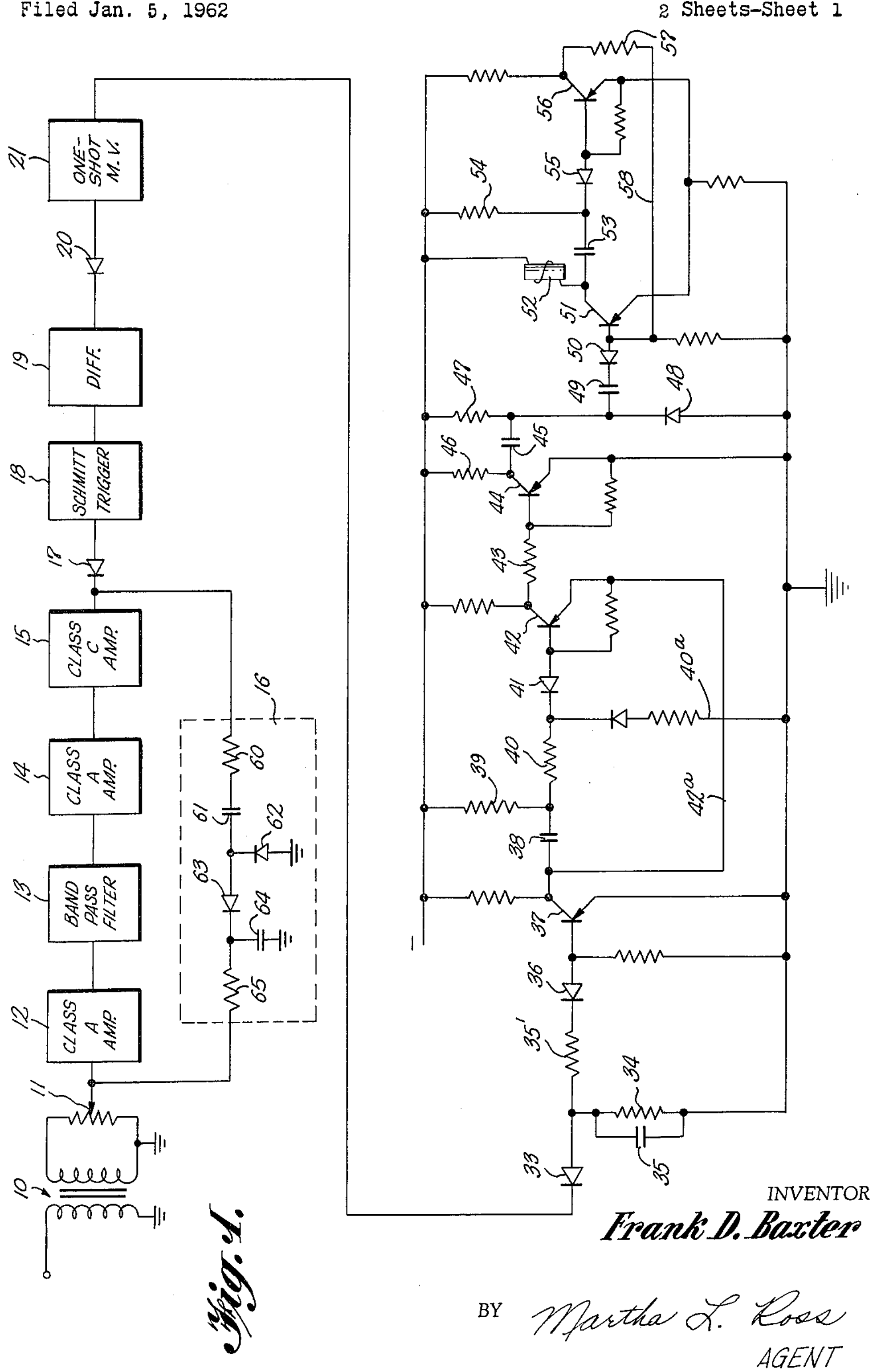

FIGURE 1 shows an exemplary embodiment of the subject invention in block diagram and schematic form. The assurance signals being sent to the transmitting or sending station on the return circuit are at frequencies of 1920 and 1990 c.p.s. These frequencies have been shifted from the mark and space frequencies transmitted by the sending station and are chosen to reduce interference between the trunklines and the return circuits. The strength of these assurance signals can vary, depending upon factors such as the distance traveled, and are usually within the range of —18 to —35 dbm, the reference or 0 dbm being one milliwatt across 600 ohms. Thus, for one message, the assurance signal on the return circuit may be at a —20 dbm level, while for another message the assurance signal may be at a —28 dbm level. These signals are coupled to the circuit of the present invention by transformer 10 such that the line carrying the signals sees a high impedance and experiences essentially no power loss. Sensitivity control 11 is adjustable to establish the desired minimum operating level as, for example, from 0 dbm to —40 dbm, the specific level chosen for the illustrative embodiment being —37 dbm. The signals are applied to bandpass filter 13 through a low-level class A amplifier 12. The filter 13 is a conventional three-element $\pi$-section filter constructed to pass a frequency band, including both of the signal frequencies, while providing attenuation of frequencies outside of this band. The signals then pass to another class A amplifier 14. By having both of the amplifiers 12 and 14 operating class A, no distortion is generated, which decreases the possibility of harmonics passing through the filter. Connected to amplifier 14 is amplifier 15 which is biased to give maximum gain since distortion is no longer of importance.

The output of amplifier 15 is fed back to amplifier 12 by an automatic-gain-control network 16. In the A.G.C. network 16, the value of resistor 60 is chosen to prevent amplifier 15 from being heavily loaded, and thus prevents an undesirable voltage drop to the trigger 18. The high level signal from amplifier 15 is then coupled through capacitor 61 to the voltage doubler-rectifier circuit 62, 63. This positive voltage is filtered by capacitor 64 and applied through resistor 65 to the input of amplifier 12. This A.G.C. holds the output of the amplification stages reasonably constant, for example, equal to an input level of —30 dbm, over the wide range of power levels that occur at the input 10. This level is chosen to insure that trigger 18 is actuated in the presence of assurance signals, as later explained. If the signal level falls below —30 dbm, e.g., down to —35 dbm, the A.G.C. will not function. However, the voltage reaching trigger 18 will still be above its set threshold, since the sensitivity control 11 is set to the —37 dbm level. Were it not for the A.G.C., it would be impossible to detect always the db drop that occurs in the carrier level when distortion is present, since this drop could fail to fall below the threshold of the trigger 18, if the signal level, prior to the drop was in the upper part of its range.

The output of amplifier 15 is rectified at 17 to give a pulsating D.C. signal which is applied to the trigger circuit 18. The trigger circuit 18 is connected to a one-shot multivibrator 21 by the differentiating circuit 19 and diode 20, which passes only the negative pips to trigger the multivibrator 21.

Figure 2:
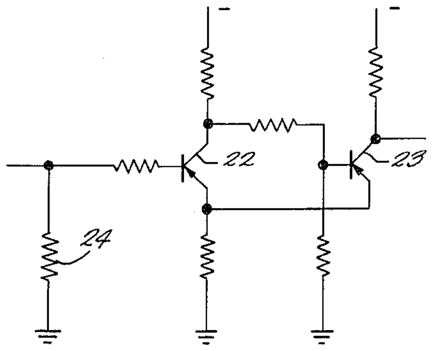
FIGURE 2 is a schematic diagram of a circuit represented by a block in FIGURE 1.

FIGURE 2 is a schematic of the Schmitt trigger 18. In the absence of a carrier or signal, or with a low-level carrier, transistor 23 is conducting. In the presence of a carrier at the input in the —18 to —35 dbm range, the pulsating D.C. signal from diode 17 applied across resistor 24, reaches sufficient amplitude in its negative excursion to turn on transistor 22. Transistor 23 cuts off and its collector rises to nearly full negative battery. When the positive excursion of this pulse drops below the switching level of transistor 22, the transistors return to their original states, and the collector of transistor 23 drops to ground. The trigger 18 is, therefore, used as a threshold or level sensing switch, the output being a series of pulses that are differentiated and rectified to pass a series of negative pips to multivibrator 21.

Figure 3:
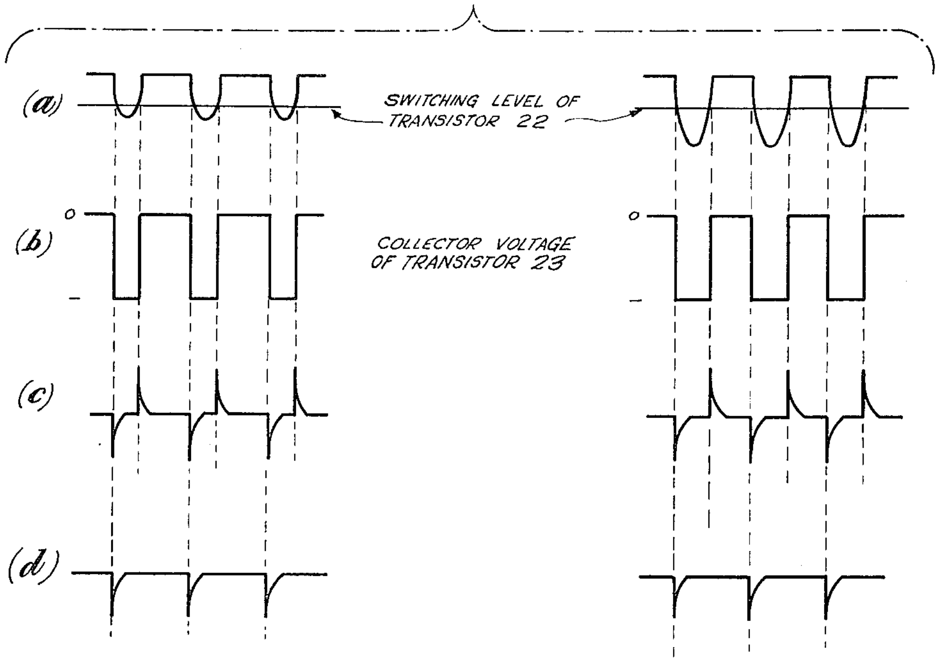
FIGURE 3 are waveforms occurring at different points in the system.

Since the carrier or assurance signal level input varies over a wide range and the A.G.C. circuit 16 cannot completely compensate for this variance, as when the input is at —35 dbm, the result is that the pulsating signal has an amplitude dependent in part upon the carrier level input. This varying amplitude will cause the on-off states of the transistors 22 and 23 to vary. This is better understood by referring to the waveforms of FIGURE 3. If the amplitude of the rectified signal is low as shown on the left of FIGURE 3 (*a*), transistor 23, line (*b*), will be conducting for a much longer period of time than it is non-conducting. If the amplitude of the rectified signal is high, the conducting and non-conducting period will differ from the previous condition, as shown on the right of FIGURE 3 (*b*). This results in output pulses for transistor 23 that may vary in length and renders these pulses unfit for use in the timing circuits that follow since the varying length pulses would create a varying D.C. level at capacitor 35. The output pulses in either case shown in FIGURE 3 (*b*) are differentiated, line (*c*), and due to the presence of diode 20, only the negative pips, line (*d*), reach multivibrator 21. It should be noted that regardless of the pulsating signal level applied to transistor 22, the negative pips reaching multivibrator 21 are always substantially the same distance apart and, therefore, always arrive at multivibrator 21 at substantially a constant frequency.

Figure 4:
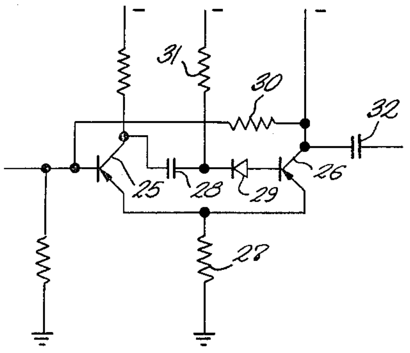
FIGURE 4 is another schematic diagram of a circuit represented in block form in FIGURE 1.

The constant amplitude and constant width pulses necessary to establish a constant D.C. level for the timing circuits, regardless of the carrier level input, are obtained in the one-shot or monostable multivibrator 21, shown in schematic form in FIGURE 4. Normally, transistor 26 is conducting, and transistor 25 is non-conducting due to the very low negative potential on its base and the back-biasing of the emitter by the negative potential developed across resistor 27. The multivibrator 21 responds to the negative pip from diode 20, causing transistor 25 to conduct. The left side of capacitor 28 was charged to nearly full negative battery when transistor 25 was non-conducting. When transistor 25 conducts, its collector goes nearly to ground and the right side of capacitor 28 goes positive back-biasing diode 29. This cuts off the current to the base of transistor 26, and it becomes non-conducting. Its collector rises to nearly full negative battery and this voltage is applied to the base of transistor 25 through resistor 30 to aid in the switching action and to hold transistor 25 on. The positive charge on capacitor 28 decays, the path being from negative battery through resistor 31, conducting transistor 25 and resistor 27 to ground. After a period of time, as determined by the discharge path time-constant, diode 29 is again forwardly biased and transistor 26 begins to conduct. Transistor 25 cuts off and the multivibrator 21 has completed its cycle. The circuit component values are selected to insure that the multivibrator 21 cycles completely before the next pip arrives, thus giving a constant amplitude, constant width pulse outupt at the collector of transistor 26. This output is coupled through capacitor 32 and diode 33 in FIGURE 1, producing a negative voltage across resistor 34, filtered by capacitor 35. Thus it is seen that the combination of the trigger 18, multivibrator 21 and capacitor 35 provide a manner of obtaining a constant D.C. level regardless of the varying level of an alternating or pulsating input to trigger 18, provided the level is above the threshold of this trigger. This constant D.C. voltage is vital in the establishment of the lower timing limit in the timing circuits.

Capacitor 35 and resistor 34 also serve to aid in controlling the decay of this voltage when the level of the carrier frequencies has dropped or has been cut-off. In this manner, a lower timing limit, e.g. 20 milliseconds, is formed, which prevents short interruptions from actuating the output circuits. Connected to this RC circuit through resistor 35' and diode 36 is transistor 37, whose collector is connected to the left side of capacitor 38. The right side of capacitor 38 is connected to the diode 41 through resistor 40, and to one end of resistor 39, the other end of this resistor being connected to negative battery. The diode 41 is connected to the base of transistor 42, and the emitter of this transistor is connected to the collector of transistor 37 by line **42*a*. Line 40*a* offers a charge path for capacitor 38 when transistor 37 is non-conducting. Capacitor 38 and resistor 39** afford a reasonably long delay so that initial transients in the assurance signals will not actuate the output circuits.

The collector of transistor 42 is connected to the base of transistor 44 through resistor 43, with the collector of this transistor connected to resistor 46 and the left side of capacitor 45. The resistor 46 is also connected to negative battery. The right side of capacitor 45 is connected to the resistor 47 and the cathode of diode 48. The anode of diode 48 is connected to ground and the resistor 47 is connected to negative battery. These last mentioned circuit elements in combination with transistor 44 form the upper timing limit which keeps a disconnect or a long circuit interruption from actuating the output circuits. This upper timing limit is 50 ms., which can be changed by changing the values of capacitor 45 and/or resistor 47.

The right side of capacitor 45 is also connected to transistor 51 through capacitor 49 and diode 50. Relay 52, which can be used to actuate an indicating device such as a counter, message register or other recording or indicating equipment, is connected between the collector of transistor 51 and negative battery. The capacitor 53 is connected on one side to the collector of transistor 51 and on the other side to the junction point of the cathode of diode 55 and resistor 54, the other end of this resistor being connected to the negative potential source. The anode of diode 55 is connected to the base of transistor 56 with its collector in turn connected to the base of transistor 51 through resistor 57 in line 58.

In operation with no carrier frequencies in the return circuit, there are no signals being applied at the input transformer 10, and accordingly there is no pulsating output from the Schmitt trigger 18 to actuate multivibrator 21. Transistors 37, 42 and 51 are non-conducting, and transistors 44 and 56 are conducting. When either frequency (1920 or 1990 c.p.s.) of the carrier is applied at the input, it passes through the amplifying, filtering and rectifying stages and appears as a pulsating D.C. voltage to actuate trigger 18. The output of trigger 18 is differentiated and the negative pips are applied to one-shot multivibrator 21 to generate the output pulses. Transistor 37 conducts due to the negative voltage developed across resistor 34.

Capacitor 38 had been previously charged to essentially the full negative battery voltage. When transistor 37 conducts, its collector goes to ground potential, causing the right side of capacitor 38 to assume a positive charge equivalent to the value of the aforementioned negative potential. This positive voltage back-biases diode 41 and blocks the base bias from reaching transistor 42. Were it not for this back-biasing, transistor 42 would conduct since its emitter is essentially connected to ground through line 42*a* when transistor 37 is conducting. Capacitor 38 begins to discharge through resistance 39 to negative battery. A predetermined time later, as chosen by the values of capacitor 38 and resistor 39, the positive voltage on capacitor 38 has decayed sufficiently to permit diode 41 to be forward-biased and transistor 42 conducts. The delay time between the conduction of transistor 37 and the conduction of transistor 42 is of the necessary length to prevent the initial transients of the assurance signals from indicating a count. This is realized by the fact that transistor 42 has to be conducting and then become non-conducting to affect the timing circuit of transistor 44 as later described. Since transistor 42 is not yet conducting, any circuit interruptions, sufficient in duration to allow the charge on capacitor 35 to decay and thus turn off the transistor 37, cannot affect the timing circuit of transistor 44. The only effect these initial interruptions would have, if transistor 37 is cut off, would be to start recharging capacitor 38 and thus increase the delay time before transistor 42 conducts. In the illustrative embodiment shown, the set delay time is 700 milliseconds which can, of course, be changed by changing the values of capacitor 38 and/or resistor 39.

When transistor 42 conducts, its collector goes to ground, removing the negative voltage from the base of transistor 44, and this transistor becomes non-conducting. Its collector rises to nearly full negative battery which charges capacitor 45 to this potential, the charge path being from negative source through resistor 46 and diode 48 to ground.

The unit is now ready to detect and effect an output should the timed drop appear in the carrier level of the assurance signal frequencies in the return circuit. If the aforementioned monitoring device that is measuring the telegraph signals being received at the termination of a trunk line sees distortion, it causes this timed drop in carrier level, e.g., a 10 db, 35 millisecond drop, in the return circuit. This drop is also experienced at input transformer 10 and passes to the trigger 18 before the A.G.C. can respond. This results in a decrease below the threshold level of the voltage being applied to this trigger, and it no longer follows the negative half-cycles. Consequently, no pips are passed to the multivibrator 21, and no output pulses from multivibrator 21 are fed to transistor 37. Capacitor 35 begins to discharge through resistor 34, and resistor 35′, diode 36 and transistor 37. Since the top is 35 milliseconds long and, therefore, longer than the 20 ms. lower timing limit, the voltage on capacitor 35 falls below the value required to hold transistor 37 conducting. When transistor 37 cuts off, the emitter of transistor 42 rises to full negative battery through line 42*a* and transistor 42 becomes non-conducting. Transistor 44 begins to conduct and the left side of capacitor 45 goes to ground. The nearly full negative battery voltage present on this left side of capacitor 45 becomes a positive charge on the right side and capacitor 45 begins to discharge through resistor 47.

When the carrier returns to its original level at the end of the 35 ms. period, Schmitt trigger 18 and multivibrator 21 again begin their cycling. Transistor 37 conducts. The charge on capacitor 38 accumulated during the 35 millisecond period when transistor 37 was non-conducting is minor and, if at all, would back-bias diode 41 for but a few milliseconds. Transistor 42, therefore, conducts. Transistor 44 cuts off and its collector rises suddenly to the negative battery potential. At the end of the 35 millisecond period, the charge on the right side of capacitor 45 is still at some positive voltage. When the collector of transistor 44 rises to the negative potential, it causes this positive charge to pass as a negative pip through capacitor 49 and diode 50 to transistor 51, turning it on. Its collector goes nearly to ground and the relay 52 is actuated. Transistor 56 cuts off due to the back-biasing of diode 55 by capacitor 53, the operation being the same as earlier described in the operation of capacitor 38 in back-biasing diode 41. The collector of transistor 56 goes to negative battery voltage which is fed to the base of transistor 51 through resistor 57 in line 58. This holds transistor 51 conducting and relay 52 closed until the charge on capacitor 53 decays sufficiently for diode 55 to be forward-biased again. Transistor 56 conducts, removing the negative potential from the base of transistor 51, thereby shutting off this transistor. Relay 52 releases, and the circuitry is ready to receive another signal. In the embodiment shown, relay 52 should remain closed for approximately 45 milliseconds to operate effectively the counters, registers or other equipment.

The system as just described is capable of detecting a timed power drop in the level of an input signal, and rejecting signals that fail to fall within this timing period. In the exemplary embodiment shown, 20 ms. was selected as the lower limit and 50 ms. as the upper. If interruptions or reductions in level occur in the assurance signals for a period of time less than the 20 ms. lower timing limit, the charge on capacitor 35 will not have decayed sufficiently to turn off transistor 37. If the interruptions or reduction in level of the assurance signals are greater than 50 ms. then capacitor 45 will have sufficiently discharged which, when transistor 44 cuts off, leaves no charge, or a very slight charge, to be passed to the transistor 51, and accordingly transistor 51 does not conduct. The range between 20 and 50 ms. insures that the signal drop will still be detected should its timing vary from the prescribed 35 ms. period by as much as ∓15 ms. If a smaller range was desired, or if it was desired to have the system respond to a drop of a different time duration, this could be obviously accomplished by changing the time constants of the various RC circuits.

While the circuit has been described with regard to a db drop in power level, it is obvious that other parameters such as voltage are capable of the same measurement. Further, it is to be understood that the system diagrams and various timing periods disclosed are but exemplary embodiments of the present invention and are not to be construed as limitations thereof.

I claim:

1. Apparatus for detecting a timed change in the level of input signals having a level range through which said signals may vary, the magnitude of said timed change being less than said level range, comprising means for receiving said input signals and establishing a substantially constant output level throughout said input level range in the absence of a change, said output level experiencing a change upon the occurrence of said timed change in said input signal, a level sensing means responsive to said substantially constant output level for establishing a constant voltage level, and timing means, having lower and upper timing limits, responsive to said level sensing means for producing an indication upon the absence of said constant voltage level for a time duration within said upper and lower timing limits.

2. Apparatus for detecting a timed drop in the level of telegraph assurance signals having a level range through which said signals may vary, the magnitude of said timed drop being less than said level range, comprising input means for receiving said telegraph assurance signals and establishing a substantially constant output level throughout said input level range in the absence of a drop, said output level experiencing a drop upon the occurrence of said timed drop in said input signals, a level sensing means responsive to said substantially constant output level for establishing a constant voltage in the absence of a drop, a signal timing gate, having an upper timing limit and a lower timing limit, responsive to said level sensing means for producing an output upon the absence of said constant voltage for a time duration within said upper and lower timing limits, and indicating means responsive to the output of said signal timing gate for effecting an indication when a drop in input level is of a time duration within said timing limits.

3. A system for detecting a timed drop in the level of input signals having a level range through which said signals may vary, the magnitude of said timed drop being less than said level range, comprising means for receiving said input signals and establishing a substantially constant output level throughout said input level range in the absence of a drop, said output level experiencing a drop upon the occurrence of said timed drop in said input signals, a level sensing means responsive to said substantially constant output level for establishing a constant voltage level, and timing means, having lower and upper timing limits, responsive to said level sensing means for producing an indicating signal upon the absence of said constant voltage level for a period of time ending between said lower and upper timing limits.

4. A system as claimed in claim 3 wherein the input signals are A.C. signals and said receiving means includes automatic gain control, and said level sensing means comprises means for converting said substantially constant output level to a constant D.C. voltage.

5. A system as claimed in claim 4 wherein said timing means includes an indicator drive circuit to generate said indicating signal upon the occurrence of said time drop.

6. A system as claimed in claim 5 wherein said timing means includes a delay circuit to prevent initial transients in the input signals from producing an indicating signal.

References Cited by the Examiner

UNITED STATES PATENTS

| | | | |
|---|---|---|---|
| 2,249,323 | 7/1941 | Mitchell | 178—69 |
| 2,484,352 | 10/1949 | Miller et al. | 340—167 |
| 2,515,968 | 7/1950 | Shankin | 340—167 |
| 2,540,115 | 2/1951 | Hopkinson | 340—167 |
| 2,597,071 | 5/1952 | Cory | 178—69 |
| 2,719,226 | 9/1955 | Gordon et al. | 328—129 |
| 2,939,915 | 6/1960 | Britt et al. | 178—69 |
| 3,003,031 | 10/1961 | Posthumus | 178—69 |
| 3,020,483 | 2/1962 | Losee | 325—41 |
| 3,060,329 | 10/1962 | Harrison et al. | 307—88.5 |
| 3,120,616 | 2/1964 | Ishimoto et al. | 307—88.5 |

FOREIGN PATENTS

| | | |
|---|---|---|
| 103,670 | 4/1938 | Australia. |

NEIL C. READ, *Primary Examiner.*

ROBERT H. ROSE, *Examiner.*

A. J. DUNN, T. A. ROBINSON, *Assistant Examiners.*